United States Patent [19]

Feingold et al.

[11] 4,112,054

[45] Sep. 5, 1978

[54] PROCESS AND APPARATUS FOR REMOVING ETHYLENE OXIDE FROM GAS COMPOSITIONS

[75] Inventors: Michael Feingold, Randolph; John Sparks, Boston, both of Mass.

[73] Assignee: New England Industrial Chemical Co., Mass.

[21] Appl. No.: 800,160

[22] Filed: May 25, 1977

[51] Int. Cl.² .................................................. B01D 53/34
[52] U.S. Cl. ..................................... 423/245; 423/210; 421/34; 568/867
[58] Field of Search ................................ 423/210, 245; 21/DIG. 4, 53, 55, 58; 260/635 E

[56] References Cited

U.S. PATENT DOCUMENTS

| | | | |
|---|---|---|---|
| 2,135,271 | 11/1938 | Balcar | 260/635 E |
| 2,636,906 | 4/1953 | Davis | 260/635 E |
| 2,899,266 | 8/1959 | Gewalt et al. | 21/58 |
| 3,093,242 | 6/1963 | Huyck et al. | 21/58 |
| 3,098,751 | 7/1963 | Huyck et al. | 21/58 |

Primary Examiner—Earl C. Thomas
Attorney, Agent, or Firm—Paul J. Cook

[57] ABSTRACT

A process for removing ethylene oxide from a gas composition containing ethylene oxide by intimately contacting the gas composition with an aqueous acidic solution and having a pH less than about 4 and an initial temperature less than about 50° C when the solution comprises the minimum volume required to substantially completely convert the ethylene oxide. The initial pH and temperature of the solution and the initial mole ratio of acid in solution to ethylene oxide being converted is controlled to permit substantially complete conversion of ethylene oxide to products including ethylene glycol and polyethylene glycols while preventing evolution of dissolved ethylene oxide from solution. During reaction, the solution temperature is maintained less than about 70° C to avoid evolution of dissolved ethylene oxide.

8 Claims, 1 Drawing Figure

U.S. Patent  Sept. 5, 1978  4,112,054
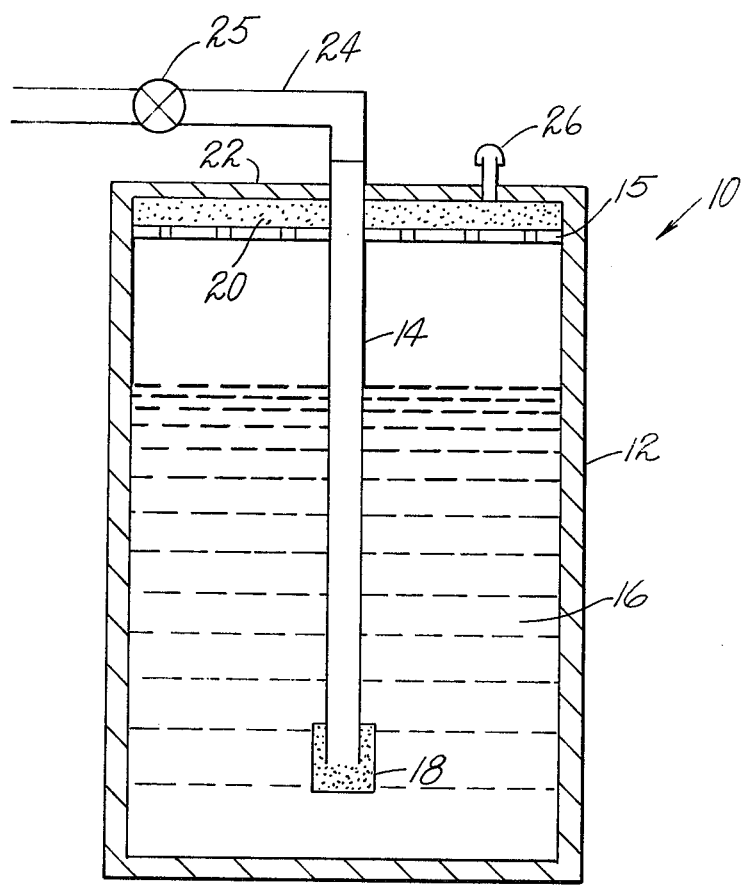

PROCESS AND APPARATUS FOR REMOVING ETHYLENE OXIDE FROM GAS COMPOSITIONS

BACKGROUND OF THE INVENTION

This invention relates to a method and apparatus for removing ethylene oxide from gas compositions containing ethylene oxide and more particularly to a method and apparatus for removing ethylene oxide from a gaseous effluent utilized to sterilize articles, particularly for medical use.

At the present time, it is common practice to sterilize articles, particularly articles for medical use, with ethylene oxide. Typically, the article to be sterilized is placed in a chamber which is evacuated. The ethylene oxide is introduced into the evacuated chamber and allowed to remain therein until the article is sterilized, usually from about 1 to 3 hours. The ethylene oxide then is vented from the chamber into the surrounding atmosphere. Presently, the ethylene oxide is available from cartridges in three standard sizes of about 30 g, 70 g and 134 g which corresponds to their use in 1 ft$^3$, 2 ft$^3$ and 4 ft$^3$ gas sterilization instruments respectively. In these sizes, the cartridges can be hand-carried easily to a desired location which is desirable, if not essential in most medical environments such as hospitals.

Unfortunately, ethylene oxide is a toxic material and special precautions must be taken to assure that it is vented to an area remote from persons. Generally, venting systems are provided so that the ethylene oxide is directed outside of the building within which persons are present. However, even these systems are hazardous since there is still the possibility that persons outside of the building unknowingly could come into contact with the ethylene oxide before it has been sufficiently diluted in the outside atmosphere. Also, it is not uncommon for the exhausted ethylene oxide to be vented into a wet sponge located in a container within a working area.

Accordingly, it would be highly desirable to provide a means for neutralizing the toxic effects of ethylene oxide. In addition, it would be desirable to provide such a means which can be rendered portable to afford quick and efficient use, particularly in a medical environment. Also, it would be desirable to provide such a process wherein dissolved ethylene oxide is not entrained from solution by "inert" portions of a gaseous mixture prior to converting the ethylene oxide in solution. Furthermore, it would be desirable to provide a means for removing ethylene oxide from gaseous mixtures which does not rely upon the step of venting into the atmosphere or other such step where personnel are exposed directly to ethylene oxide.

SUMMARY OF THE INVENTION

This invention provides a method and apparatus for removing ethylene oxide from gas compositions such as gaseous mixtures including gaseous mixtures containing air and/or the common diluent gases for ethylene oxide such as carbon dioxide or fluorochlorohydrocarbons. The apparatus comprises a container for an aqueous acidic solution, means for introducing a gas containing ethylene oxide into the solution and means for removing the gas, essentially free of ethylene oxide from the container. The volume and pH of the aqueous solution and the amount of acid in the container must be controlled to assure that the ethylene oxide is dissolved in solution without increasing the solution temperature to the point where dissolved ethylene oxide is evolved from solution or where dissolved ethylene oxide is entrained from solution by the other gases in the mixture and so that the dissolved ethylene oxide is essentially completely converted to products including ethylene glycol and polyethylene glycols to effect removal of at least 97% ethylene oxide. Less than about 97% removal of ethylene oxide constitutes a health hazard in the adjacent environment. The ethylene oxide-free gas is removed from the container by any conventional valve means either during conversion of ethylene oxide in solution or subsequent to conversion of the ethylene oxide.

BRIEF DESCRIPTION OF THE DRAWING

The drawing is an elevational cross-sectional view of the apparatus of this invention.

DETAILED DESCRIPTION OF SPECIFIC EMBODIMENTS

In accordance with the process of this invention, a gaseous mixture containing ethylene oxide is dissolved in an acidic aqueous solution and is converted therein to products including ethylene glycol and polyethylene glycols. The dissolution of ethylene oxide in water is exothermic and, if the temperature of the solution exceeds about 70° C, the dissolved ethylene oxide is evolved from solution undesirably. Therefore, the volume of acidic solution should be at least about 440 ml per mole of ethylene oxide dissolved. Furthermore, the initial temperature of the acidic solution should be less than about 50° C, preferably less than about 30° C prior to dissolving the ethylene oxide so that ethylene oxide or excess steam will not be evolved from solution. When the acid solution is of sufficient strength such that the reaction with ethylene oxide is very rapid, very little, if any, unconverted ethylene oxide is in solution at a given time. In this instance, a moderate temperature rise will not greatly effect the efficiency of the process. However, in very dilute solutions, the reaction is considerably slower and the quantity of unreacted ethylene oxide in solution is relatively large. For example, a relatively small rise in temperature, e.g. 10° C, can cause an unacceptable decrease of ethylene oxide solubility in water. The unreacted ethylene oxide then can escape into the atmosphere. This is a problem especially when the ethylene oxide is part of a gaseous mixture since the "inert" portion of the mixture effectively entrains the ethylene oxide to carry it into the atmosphere. In solution, at least a portion of the ethylene oxide is protonated at the oxygen atom. Reaction of this protonated species with water or another molecule of ethylene oxide produces ethylene glycol or a polyethylene glycol respectively with the regeneration of a proton. In the preferred embodiment of this invention, the protonated ethylene oxide can react with a halogen anion to give the corresponding halohydrin.

The formation of ethylene glycol, polyethylene glycols and halohydrins also is exothermic. The control of the rate of reaction as utilized herein primarily depends upon whether pure ethylene oxide or a gaseous mixture containing ethylene oxide is treated. When treating such a gaseous mixture, an essentially instantaneous reaction in solution is preferred in order to avoid entrainment of dissolved ethylene oxide from solution by the "inert" portion of the gaseous mixture. The possible overheating of solution in this mode can be controlled by providing a total volume of solution with sufficient heat capacity to maintain solution temperature below about 70° C, preferably below about 60° C. When treating pure ethylene oxide, entrainment by "inert" gases is not a problem and excessive solution temperature is preferably controlled by controlling the rate of ethylene oxide reaction and by regulating solution pH and the amount and type of acid in solution. It has been found that the pH of the acidic solution should be less than about 4, preferably less than about 2 and more preferably between about 0 and 1 in order to control the rate of reaction while at the same time permitting substantially complete conversion of ethylene oxide within a reasonable time. Should the pH of the solution exceed about 4, unreasonably long reaction times will result in the order of about 3 hours which seriously reduces the practical advantages of the process. In addition, the rate of reaction will be so slow as to permit ethylene oxide to pass through the solution. Since portability is an important characteristic of most ethylene oxide sterilization systems, the total volume of the system of this invention also should be capable of being portable. For the conversion of about 30 g ethylene oxide which corresponds to about 1 ft$^3$, the solution volume can be as little as about 300 ml, preferably about 380 ml. For the 2 ft$^3$ and 4 ft$^3$ ethylene oxide gas sterilizing, the solution volumes are proportional to the 1 ft$^3$ figures given.

Representative suitable acid solutions for use in the present invention are oxalic acid from about 0.02 M to about 1 M, sodium bisulfate from about 0.02 M to about 3 M, hydrochloric acid from about 0.2 M to about 2.0 M, hydrobromic acid from about 0.1 M to about 2.0 M or the like.

The mole ratio of the acid to ethylene oxide is between about 0.01 and 6.

In a preferred aspect of this invention, it is preferred to utilize an acid catalyst which promotes a solution pH change during the conversion of the ethylene oxide. In this embodiment, a pH indicator which changes color over the pH change caused by ethylene oxide conversion can be utilized. The preferred acids are the halogen acids such as hydrogen chloride or hydrogen bromide. When 0.2 M to about 2 M hydrogen chloride is utilized, solution pH changes from about 0 to 0.7 which permits the uses of methyl violet, crystal violet, ethyl violet, malachite green or malachite green oxalate as an indicator. When 0.3 M to about 2.0 M hydrogen bromide is utilized, solution pH changes from about 0 to about 3 which permits the use of methyl violet, crystal violet, ethyl violet, malachite green or malachite green oxalate as an indicator. It is preferred to employ malachite green or malachite green oxalate as the indicator since they provide significant color change over the pH range change. This embodiment provides the distinct advantage that it permits quick differentiation between used and unused solutions and apparatus. In another aspect, it has been found also that hydrogen chloride, hydrogen bromide or hydrogen iodide solutions permit greater scrubbing efficiencies in removing ethylene oxide from gaseous mixtures of 99% and greater.

Referring to the drawing, the scrubbing apparatus 10 includes a pressure-resistant housing 12 which can be formed from high density polyethylene, for example. A gas inlet tube 14 extends into the acid solution 16 at or near the bottom of the housing 12. A gas dispersion means such as a fritted tube 18 is secured to the end of tube 14. An open-celled sponge 20 and a strip of perforated foil 15 are adhered to the interior of the top surface 22 housing 12 to function as a splash barrier for the acid solution 16. A secondary inlet tube 24 is secured to inlet tube 14 such as by being screwed together or press-fit together. Secondary inlet tube provides communication between the ethylene oxide-rich gas in the sterilization chamber (not shown) and the inlet tube 14. The secondary inlet tube 24 is provided with a one-way check valve 25 to prevent liquid from entering the sterilizing chamber (not shown). The scrubbing apparatus 10 is provided with a valve means 26 such as a conventional bunsen valve in order to prevent unduly high pressure increases within housing 12. After the ethylene oxide has been substantially completely converted, the secondary inlet tube 24 and valve 26 can be unscrewed for removal to be replaced by threaded caps or press-fit caps in order to seal the interior of the housing 12 and permit disposal of the entire scrubbing apparatus. Prior to positioning tube 24 into inlet tube 14, the interior of the housing 12 is sealed in any conventional manner such as with a screw or press-fit cap (not shown).

The following examples illustrate the present invention and are not intended to limit the same.

EXAMPLE I

This example illustrates that it is necessary to control the pH of the acidic solution in the scrubbing process of this invention. In order to determine the relative performance of each system, the outlet of container for the acidic solution was connected by tubing to a cold trap having a temperature of about −70° C. In this manner, any unconverted ethylene oxide passing through the solution could be collected and measured.

A series of 600 ml aqueous acidic solutions set forth in Table I were prepared and placed in a 2.5 inch × 12 inch (height) cylinder, equipped with an inlet for ethylene oxide gas which extended into the solution and a one-way valve designed to open at a differential pressure of about 3 psi. In each instance, 67 grams of ethylene oxide was passed into the acidic solution which had an initial temperature of about 27° C. The system was designed to remove ethylene oxide at a rate of about 30 grams per minute. The gas composition treated was either pure ethylene oxide as set forth in Table I or ethylene oxide containing 20 volume percent air based upon the gas mixture as set forth in Table II. As set forth above, it is more difficult to attain complete ethylene oxide conversion when treating the gas mixture since the "inert" gas tends to entrain ethylene oxide.

TABLE I

| ACID COMPOSITION | pH | TEMP. AT 2.5 MINS | TEMP. MAX AT MINS | EFFICIENCY |
| --- | --- | --- | --- | --- |
| Oxalic Acid | | | | |
| 0.01M | 2 | 39° C | 52° C at 63 mins | 98% |
| 0.02M | 1.7 | 43° C | 74° C at 15 mins | 100% |
| 0.025M | 1.6 | 50° C | 81° C at 10 mins | 99% |
| 0.05M | 1.3 | 50° C | 82° C at 5 mins | 99% |
| Sodium Bisulfate | | | | |
| 0.03M | 1.5 | 48° C | 78° C at 9 mins | 98% |
| 0.3M | 0.52 | 53° C | 78° C at 5 mins | 100% |
| 0.5M | 0.22 | 80° C | 80° C at 2.5 mins | 100% |
| 1.28M | 0 | 81° C | 81° C at 2.5 mins | 100% |

TABLE I-continued

| ACID COMPOSITION | pH | TEMP. AT 2.5 MINS | TEMP. MAX AT MINS | EFFICIENCY |
|---|---|---|---|---|
| 0.01M | 2 | 40° C | 51° C at 68 mins | 98% |
| Phosphoric Acid | | | | |
| 0.1M | 1 | 48° C | 87° C at 9 mins | 93% |
| 0.3M | 0.52 | 51° C | 91° C at 7 mins | 94% |
| 0.50M | 0.3 | 58° C | 91° C at 4 mins | 93% |
| Sulfuric Acid | | | | |
| 0.01M | 1.4 | 39° C | 84° C at 8 mins | 93% |
| 0.03M | 1.2 | 45° C | 87° C at 7 mins | 94% |
| 0.05M | 1 | 48° C | 88° C at 5 mins | 93% |
| Hydrochloric Acid | | | | |
| 1.0M | 0 | 53° C | 53° C at 2.5 mins | 100% |
| 1.25M | 0 | 54° C | 54° C at 2.5 mins | 100% |

TABLE II

| ACID COMPOSITION | pH | TEMP. AT 2.5 MINS | TEMP. MAX AT MINS | EFFICIENCY |
|---|---|---|---|---|
| Hydrochloric Acid | | | | |
| 0.3M | 0.5 | 47° C | 47° C | 94 % |
| 0.76M | 0.1 | 51° C | 51° C | 98+% |
| 1.4M | <0.0 | 52° C | 52° C | 98+% |
| 1.75M | <0.0 | 53° C | 53° C | 99+% |
| 2.5M | <0.0 | 54° C | 54° C | 99+% |
| 3.5M* | <0.0 | | | |
| Hydrobromic Acid | | | | |
| 2.0M | <0.0 | 53° C | 53° C | 99+% |
| 1.0M | 0.0 | 53° C | 53° C | 99+% |
| 0.75M | 0.1 | 52° C | 52° C | 98+% |
| 0.30M | 0.5 | 50° C | 50° C | 97+% |

*Does not dissolve sufficiently in high acid concentrations at high flow rates (~ 30 g/mins)

The best results are obtained with hydrochloric acid or hydrobromic acid since high removal efficiencies are attained without a significant increase in solution temperature.

We claim:

1. The process for removing at least about 97% of the ethylene oxide from a predetermined volume of a gas composition containing ethylene oxide which comprises passing said predetermined volume of said gas composition through an aqueous acidic solution to dissolve said ethylene oxide in solution and to convert said dissolved ethylene oxide to products including ethylene glycol, said solution having a pH less than about 4 and an initial temperature less than about 50° C, the volume of said solution being at least about 440 ml/mole ethylene oxide, said pH, temperature, volume of solution per mole of ethylene oxide and the mole ratio of acid to ethylene oxide being controlled to permit said dissolution and conversion of ethylene oxide while preventing evolution of dissolved ethylene oxide from solution prior to said conversion.

2. The process of claim 1 wherein said gas composition comprises a gaseous mixture.

3. The process of claim 1 wherein the mole ratio of acid to ethylene oxide is between about 0.01 and 6.

4. The process of claim 1 wherein the solution pH is between about 0 and 2.

5. The process of claim 1 wherein the solution is a 0.01 M to 0.05 M solution of oxalic acid.

6. The process of claim 1 wherein the acidic soultion comprises a solution of a halogen acid.

7. The process of claim 6 wherein the solution is a solution of hydrogen chloride containing a pH indicator.

8. The process of claim 1 wherein the solution is a solution of hydrogen bromide containing a pH indicator.

* * * * *